(12) United States Patent
Kanematsu et al.

(10) Patent No.: US 7,460,271 B2
(45) Date of Patent: Dec. 2, 2008

(54) INK JET PRINTING APPARATUS AND INK JET PRINTING METHOD

(75) Inventors: Daigoro Kanematsu, Yokohama (JP); Rie Takekoshi, Kawasaki (JP); Mitsutoshi Nagamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 11/001,063

(22) Filed: Dec. 2, 2004

(65) Prior Publication Data
US 2005/0219575 A1    Oct. 6, 2005

(30) Foreign Application Priority Data
Dec. 9, 2003    (JP)    ............... 2003-411061

(51) Int. Cl.
*G06K 15/00* (2006.01)
*B41J 29/38* (2006.01)
(52) U.S. Cl. ...................... 358/1.9; 358/3.27
(58) Field of Classification Search ................ 358/1.9, 358/2.1, 3.1, 3.06, 3.21, 3.26, 3.27, 515, 358/517, 518; 347/1, 24, 43, 100
See application file for complete search history.

(56) References Cited

U.S. PATENT DOCUMENTS

| | | | |
|---|---|---|---|
| 5,805,295 A * | 9/1998 | Mikami | 358/3.1 |
| 5,992,971 A | 11/1999 | Takahashi et al. | 347/43 |
| 6,435,639 B1 | 8/2002 | Nakajima et al. | 347/15 |
| 6,474,768 B1 | 11/2002 | Yano et al. | 347/19 |
| 6,530,638 B2 * | 3/2003 | Shibata et al. | 347/15 |
| 6,585,353 B1 | 7/2003 | Kanematsu et al. | 347/43 |
| 6,601,938 B1 * | 8/2003 | Iwasaki et al. | 347/15 |
| 6,709,082 B2 * | 3/2004 | Kaneko | 347/15 |
| 7,206,100 B2 * | 4/2007 | Namikata | 358/3.23 |

FOREIGN PATENT DOCUMENTS

JP    55-65269    5/1980

* cited by examiner

*Primary Examiner*—Gabriel I Garcia
(74) *Attorney, Agent, or Firm*—Fitzpatrick, Cella, Harper & Scinto

(57) ABSTRACT

Disclosed is an ink jet printing apparatus and an ink jet printing method whereby the occurrence of smearing and boundary bleeding can be prevented, and high quality images, such as black characters, can be printed. According to the present invention, in high black duty matrix detection processing, a printing area wherein black dots are to be formed at a comparatively high duty is detected, and in adjacent color matrix detection processing, a printing area wherein color dot is to be formed and an adjacent printing area adjacent to the printing area are detected. Based on the detection information, data for providing color dot is generated.

19 Claims, 14 Drawing Sheets

TARGET MATRIX    BLACK DOTS IN MATRIXES OF Bk DATA

| 800 DOTS | 400 DOTS | 2000 DOTS | 2000 DOTS | 0 DOT | 0 DOT | 1000 DOTS | 20 DOTS | 300 DOTS |
| --- | --- | --- | --- | --- | --- | --- | --- | --- |
| 700 DOTS | 1500 DOTS | 1000 DOTS | 20 DOTS | 0 DOT | 100 DOTS | 200 DOTS | 300 DOTS | 1000 DOTS |
| 0 DOT | 1000 DOTS | 200 DOTS | 300 DOTS | 300 DOTS | 800 DOTS | 400 DOTS | 2000 DOTS | 0 DOT |
| 100 DOTS | 200 DOTS | 300 DOTS | 1000 DOTS | 1000 DOTS | 700 DOTS | 1500 DOTS | 2000 DOTS | 0 DOT |

HIGH BLACK DUTY MATRIX INFORMATION (D1001)

| 1 | 0 | 1 | 1 | 0 | 0 | 1 | 0 | 0 |
| --- | --- | --- | --- | --- | --- | --- | --- | --- |
| 0 | 1 | 1 | 0 | 0 | 1 | 0 | 1 | 0 |
| 0 | 1 | 0 | 1 | 0 | 0 | 0 | 1 | 0 |
| 0 | 0 | 0 | 1 | 0 | 1 | 1 | 1 | 0 |

TOTAL DOTS IN MATRIXES OF COLOR (C, M AND Y) DATA

| 0 DOT | 0 DOT | 100 DOTS | 0 DOT | 0 DOT | 20 DOTS | 300 DOTS |
|---|---|---|---|---|---|---|
| 10 DOTS | 0 DOT | 0 DOT | 300 DOTS | 500 DOTS | 100 DOTS | 1000 DOTS |
| 0 DOT | 0 DOT | 20 DOTS | 0 DOT | 200 DOTS | 0 DOT | 0 DOT |
| 0 DOT | 0 DOT | 300 DOTS | 0 DOT | 700 DOTS | 50 DOTS | 0 DOT |

ADJACENT COLOR MATRIX INFORMATION (D1009)

| 0 | 0 | 0 | 0 | 0 | 0 | 0 |
|---|---|---|---|---|---|---|
| 0 | 0 | 0 | 1 | 1 | 1 | 1 |
| 0 | 0 | 1 | 0 | 1 | 0 | 0 |
| 0 | 0 | 1 | 1 | 1 | 0 | 0 |

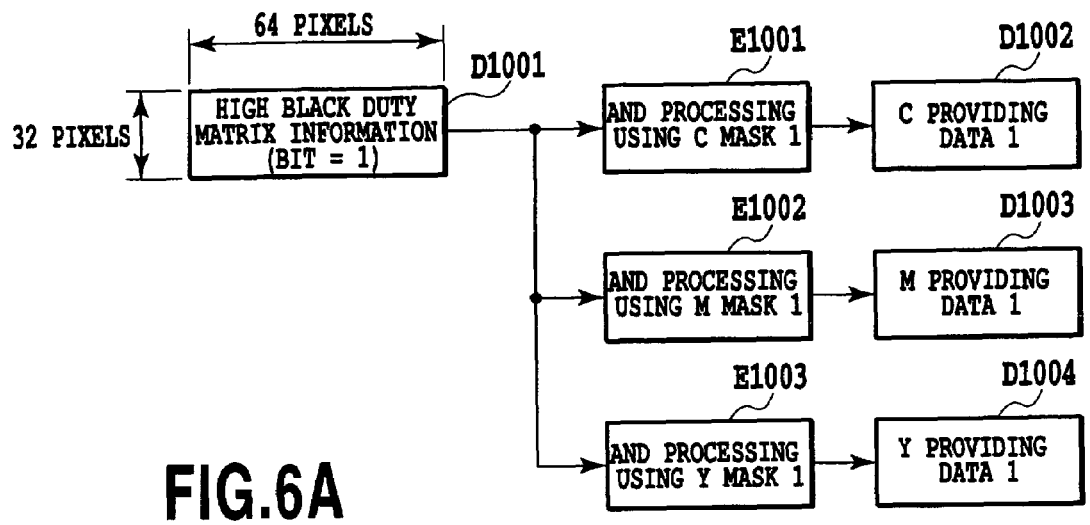
FIG.6A
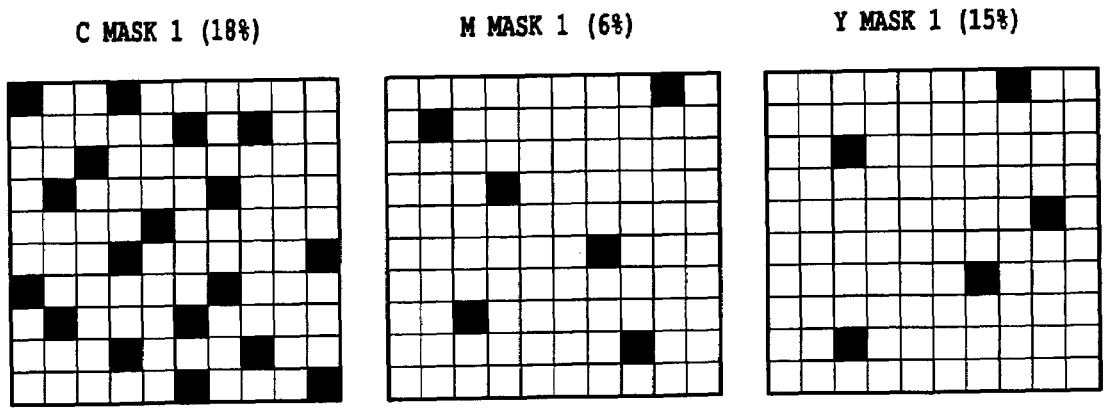
FIG.6B  FIG.6C  FIG.6D

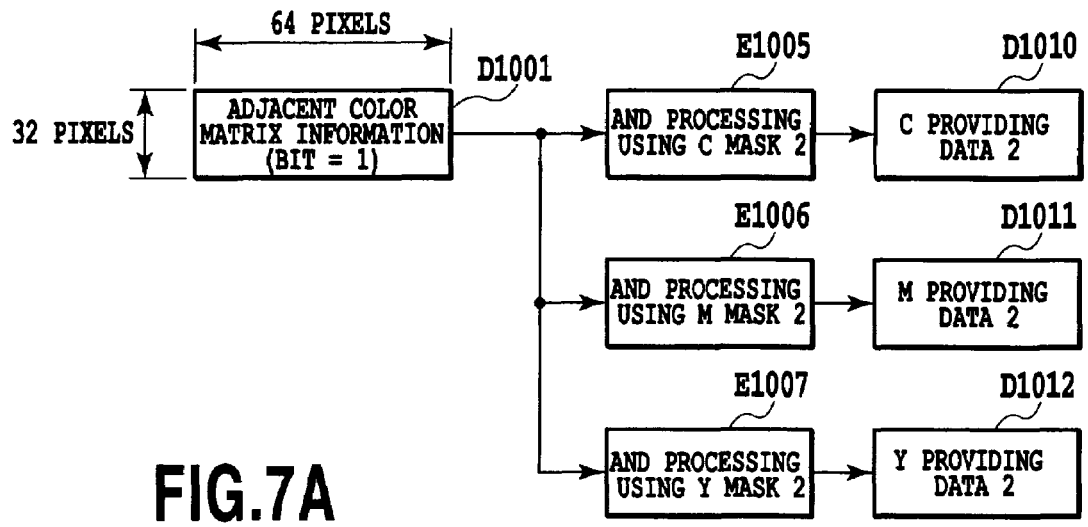
FIG.7A
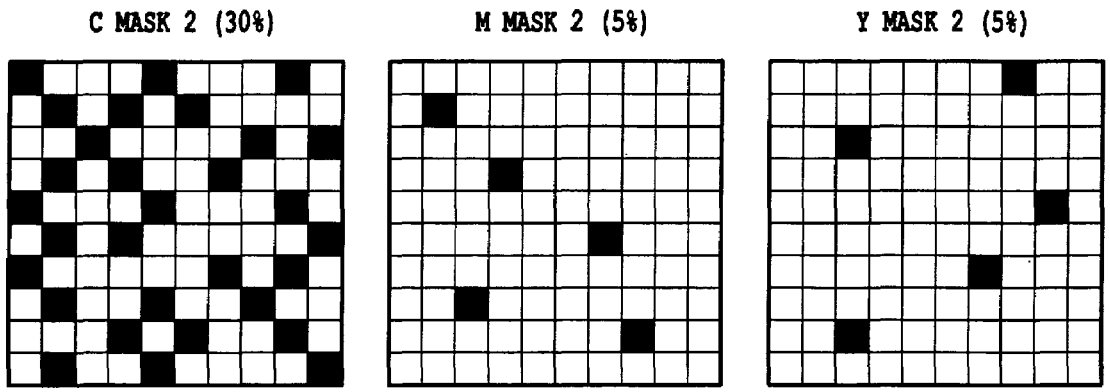
FIG.7B  FIG.7C  FIG.7D

INK JET PRINTING APPARATUS AND INK JET PRINTING METHOD

BACKGROUND OF THE INVENTION

1. Field of the Invention

The present invention relates to an ink jet printing apparatus and an ink jet printing method for performing printing by using a printing head that can eject black ink and at least one color ink.

2. Description of the Related Art

Conventionally, since an ink jet printing apparatus can print various types of printing media at a high density and at a high speed, ink jet printing apparatuses are widely employed as output apparatuses, such as printers or portable printers, for various apparatuses, and are sold commercially.

A general ink jet printing apparatus of a serial scan type comprises: a carriage mounting a printing head, which serves as printing means, and an ink tank; conveying means, for conveying a printing medium; and control means, for controlling these means. The ink jet printing apparatus repeats a serial scanning operation, in which a printing head that can eject ink droplets through a plurality of ejecting ports is moved in a direction (a main scanning direction) perpendicular to a direction (a sub-scanning direction) in which the printing medium is conveyed, and an operation in which the printing medium is conveyed a distance equivalent to a printing width. By this printing method, based on a printing signal, ink is ejected onto a printing medium to perform printing, and this printing method is frequently employed because the running costs are low and less noise is produced. Recently, furthermore, many products that employ a plurality of color inks, and that can be applied for color image printing, have been developed and put to practical use.

Since a color ink jet printing apparatus frequently employs black ink for printing characters, the production of a sharp, clear image and the acquisition of a high printing density are required. Thus, a technique is well known whereby the permeability of black ink relative to a printing medium is reduced, to prevent color material included in black ink from permeating printing medium.

As for color inks other than black, when two differently color inks are ejected onto a printing medium so they are adjacent to each other, the two colors may mix at the common boundary between them, and the quality of a printed color image may be deteriorated (boundary bleeding). To prevent this boundary bleeding, a technique has been is disclosed whereby the permeability of color inks relative to the printing medium is increased to prevent the inks from mixing on the surface of the printing medium (e.g., Japanese Patent Application Laid-open No. 55-65269(1980)).

However, when the black ink and the color inks described above are employed, the following two problems have arisen.

First, while the fixing time for color ink is short because of its high permeability, the drying and fixing time for black ink is extended because of its low permeability. Therefore, when continuous printing is performed by using a plurality of pages as the printing media, a problem occurs. That is, when printed pages are discharged and overlaid sequentially while black ink attached to the pages has not dried completely, the printing face of a page will rub against the reverse face of the following page and be smudged. This smudging occurring on the printing and the reverse face of the printing medium is called "smearing". This problem becomes ever more noticeable as the printing speed is increased.

Second, since the permeability of black ink is low, boundary bleeding may occur on a printing medium at a common boundary between black ink and color ink. And considerable deterioration of the printing quality of a color image occurs.

To resolve the two problems, the following countermeasures are conventionally taken.

A first countermeasure is a method that uses an ink fixing means such as a thermal fixing device. According to this method, ink can be rapidly fixed to a printing medium, and the occurrence of smearing and boundary bleeding can be prevented.

A second countermeasure is a method for delaying the post-printing discharge of a printing medium. According to this method, during a period following the printing of an image, on a first printing sheet, that continues until the ink has completely dried, the printing of a second sheet is temporarily delayed, or after an image has been printed on the second printing sheet, the discharge of this printing sheet is temporarily delayed until the ink on the first printing sheet has dried. Using this method, the occurrence of smearing can be prevented.

A third countermeasure is a method for overlaying an area wherein black ink is to be attached with highly permeable color ink. Since black ink is to be provided for the sheet face whereon the color ink is attached, black ink can be easily fixed to the sheet, and the occurrence of smearing can be prevented. Furthermore, since a set of black ink and color inks that react with and coagulate to each other is employed, the occurrence of boundary bleeding can be prevented.

However, the above described countermeasures have the following shortcomings.

For the first countermeasure, a shortcoming is that an increase in the size and the cost of a printing apparatus can not be avoided because a fixing means is required. Further, for a serial printer, since the printing medium conveying operation is intermittently performed, the distances traveled by printing medium conveyed to the fixing device may be uneven.

For the second countermeasure, a shortcoming is that throughput is low because the discharge of printing media is delayed.

For the third countermeasure, a shortcoming is that since color inks are overlaid on a printing medium, the sharpness of a black image and the printing quality of black characters may be reduced. Further, when the amount of color ink required to prevent smearing differs from the amount of color ink required to prevent boundary bleeding, it is difficult to prevent the occurrence both of smearing and of boundary bleeding.

SUMMARY OF THE INVENTION

To resolve the conventional problems, it is one objective of the present invention to provide an ink jet printing apparatus and an ink jet printing method that can prevent or reduce the occurrence both of smearing and of boundary bleeding, and that can print high quality black characters.

In the first aspect of the present invention, there is provided an ink jet printing apparatus using a printing head capable of ejecting black ink and at least one color ink for printing an image on a printing medium by forming black dot of the black ink and color dot of the color ink based on black data for ejecting the black ink and color data for ejecting the color ink, comprising:

first detecting means for detecting a first printing area wherein the black dots are to be formed at a comparatively high duty, based on the black data;

second detecting means detecting, as second printing area, a printing area wherein the color dot is to be formed and an adjacent printing area adjacent to the printing area, based on the color data;

first providing data generating means for generating first providing data for providing the color dot in the first printing area, based on the black data corresponding to the first printing area;

second providing data generating means for generating second providing data for providing the color dot in the second printing area, based on the black data corresponding to the second printing area;

printing color data generating means for generating printing color data by affecting the first providing data and the second providing data for the color data; and control means for controlling the printing head based on the black data and the printing color data for performing printing.

In the second aspect of the present invention, there is provided an ink jet printing method using a printing head capable of ejecting black ink and at least one color ink for printing an image on a printing medium by forming black dot of the black ink and color dot of the color ink based on black data for ejecting the black ink and color data for ejecting the color ink, comprising the steps of:

detecting a first printing area wherein the black dots are to be formed at a comparatively high duty, based on the black data;

detecting, as second printing area, a printing area wherein the color dot is to be formed and an adjacent printing area adjacent to the printing area, based on the color data;

generating first providing data for providing the color dot in the first printing area, based on the black data corresponding to the first printing area;

generating second providing data for providing the color dot in the second printing area, based on the black data corresponding to the second printing area;

generating printing color data by affecting the first providing data and the second providing data for the color data; and controlling the printing head based on the black data and the printing color data for performing printing.

According to the present invention, color dots are formed in a printing area wherein black dots are to be formed at a comparatively high duty, and in a printing area wherein color dots are to be formed and an adjacent printing area. Thus, the occurrence of smearing and boundary bleeding can be prevented or reduced. Further, color dots are not formed in a black character printing area wherein black dots are to be formed at a comparatively low duty, so that a sharp black image can be obtained.

The above and other objects, effects, features and advantages of the present invention will become more apparent from the following description of embodiments thereof taken in conjunction with the accompanying drawings.

BRIEF DESCRIPTION OF THE DRAWINGS

FIG. 6A is a diagram for explaining a color dot provision data generation processing for smear prevention in FIG. 1;

FIGS. 6B, 6C and 6D are diagrams for explaining a C mask 1, a M mask 1 and a Y mask 1 in FIG. 6A;

FIG. 7A is a diagram for explaining a color dot provision data generation processing for boundary bleeding prevention in FIG. 1;

FIGS. 7B, 7C and 7D are diagrams for explaining a C mask 2, a M mask 2 and a Y mask 2 in FIG. 7A;

DETAILED DESCRIPTION OF PREFERRED EMBODIMENTS

The preferred embodiments of the present invention will now be described while referring to the accompanying drawings. The following embodiments are examples applied for an ink jet printing apparatus.

First Embodiment

Figure 12:
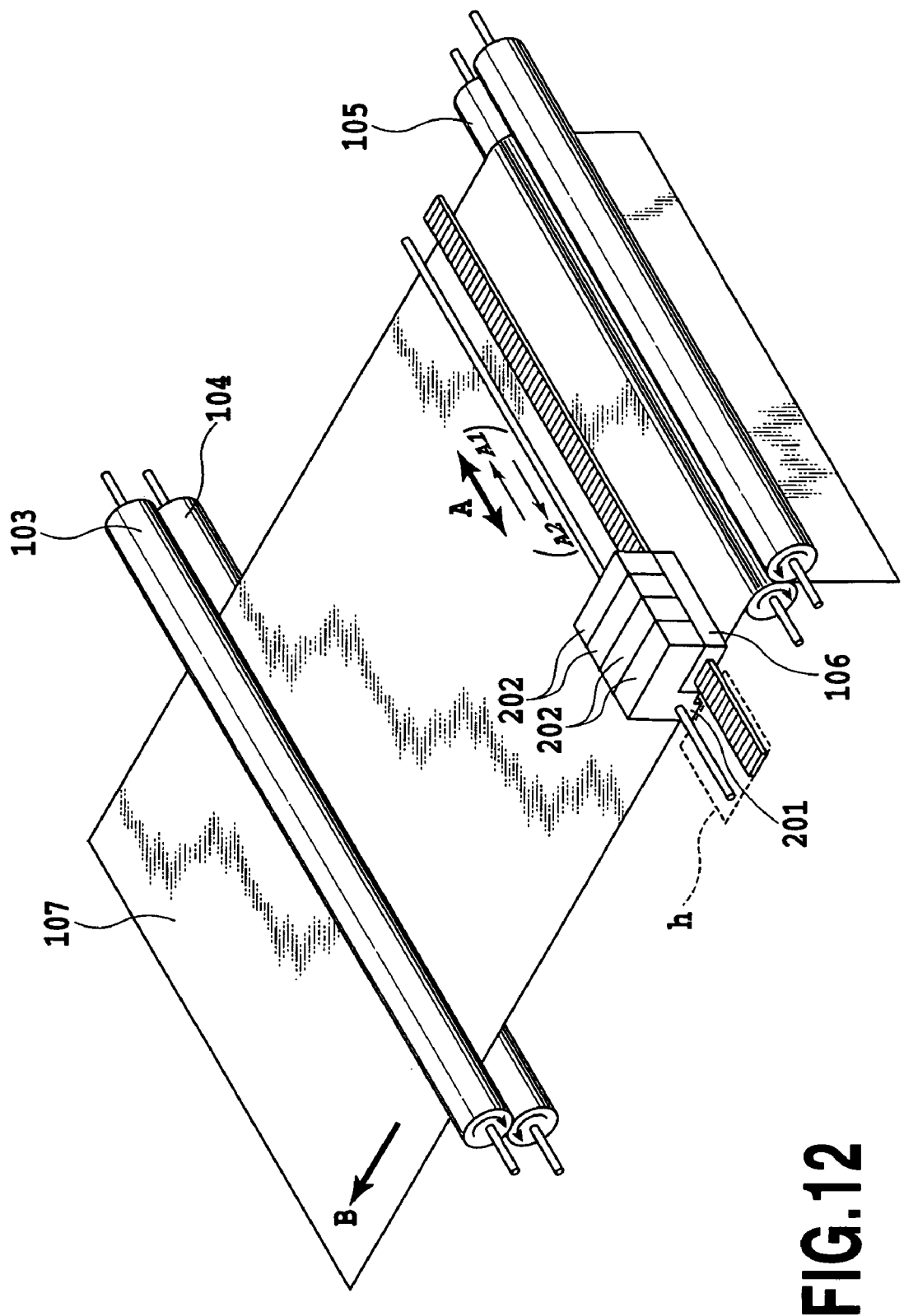
FIG. 12 is a schematic perspective view of a printing apparatus according to the first embodiment of the present invention.
Figure 13:
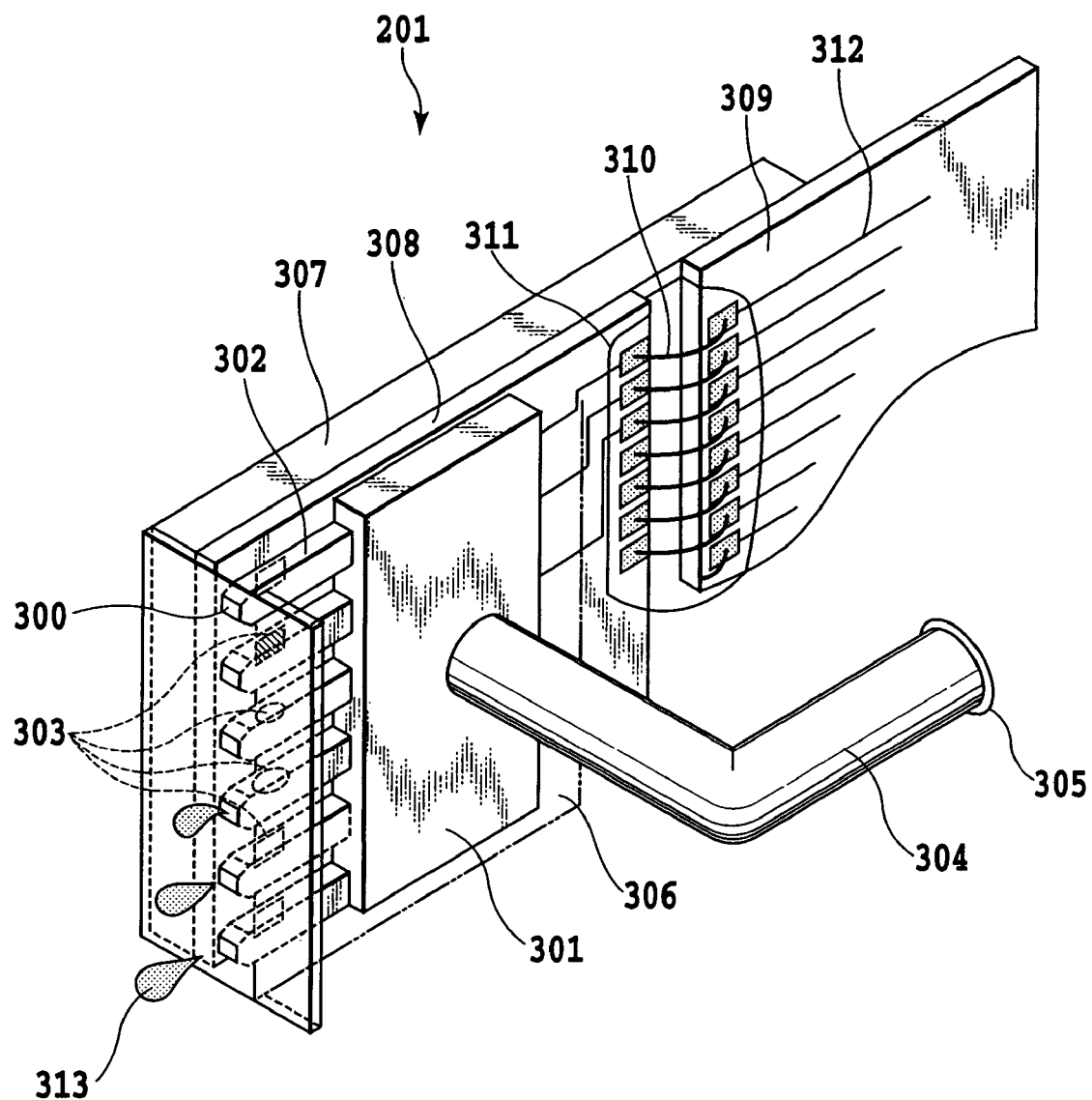
FIG. 13 is a perspective view of the essential portion of a printing head in FIG. 12.
Figure 14:
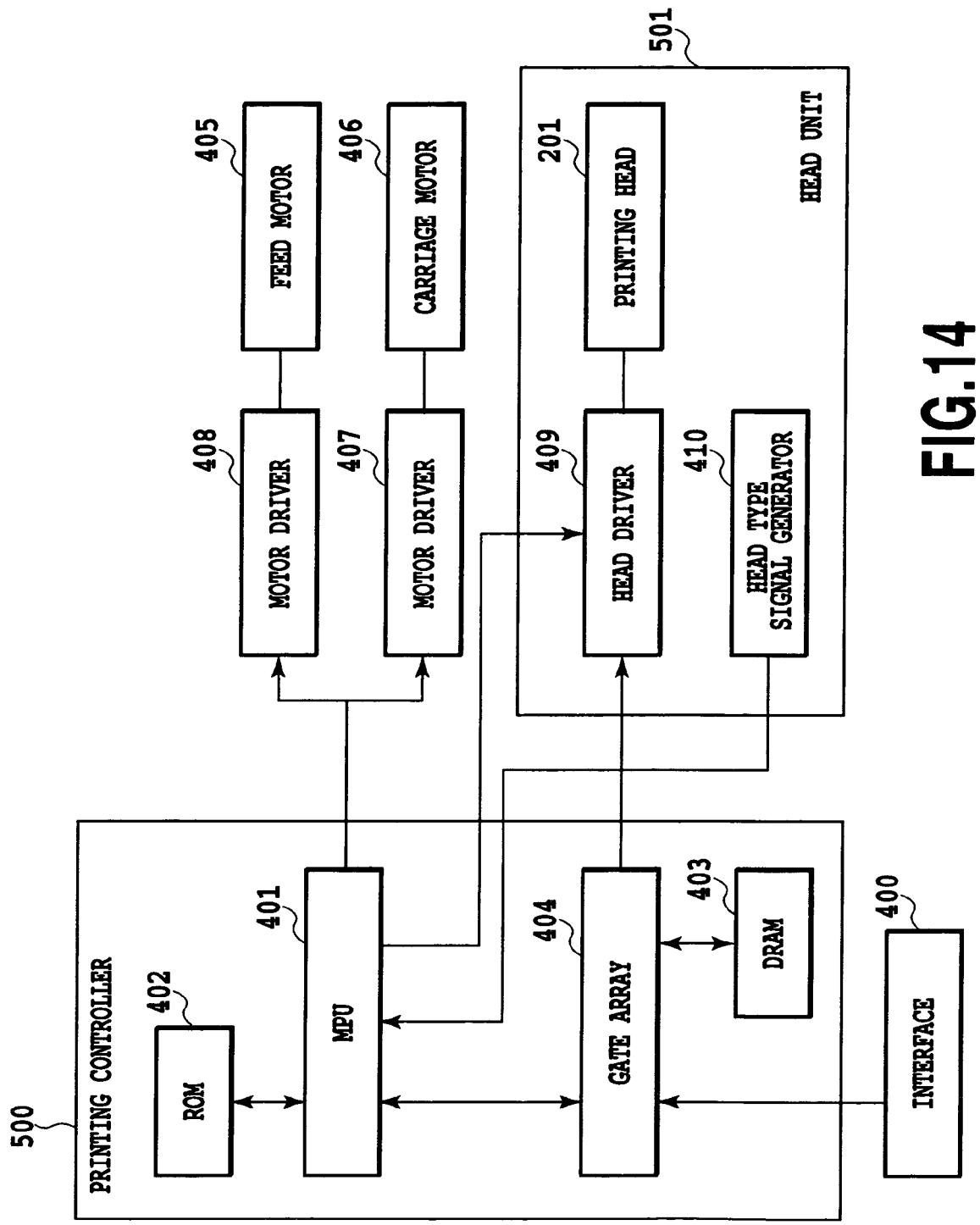
FIG. 14 is a block diagram showing the control system of the printing apparatus in FIG. 12.

FIGS. 12 to 14 are diagrams for explaining a configuration example for an ink jet printing apparatus for which the present invention can be applied, and FIGS. 1 to 8 are diagrams for explaining a first embodiment of the present invention.

(Configuration Example for a Printing Apparatus)

FIG. 12 is a schematic perspective view of a configuration example for a color ink jet printing apparatus for which the present invention can be applied.

In FIG. 12, four ink cartridges 202 are constituted respectively by ink tanks in which ink for four colors (black (Bk), cyan (C), magenta (M) and yellow (Y)) is retained and printing heads 201, the structure of which will be described later, that can eject these color inks. A paper feed roller 103, which is rotated in a direction indicated by an arrow in FIG. 12, together with an auxiliary roller 104 sandwiches a printing sheet 107, which is a printing medium, and feeds the printing sheet 107 in the direction indicated by an arrow B (a sub-scanning direction). In addition to the rollers 103 and 104, a roller 105 is also used to hold the printing sheet 107. A carriage 106, together with the four ink cartridges 202, which are mounted thereon, is moved in a main scanning direction, indicated by an arrow A. The carriage 106 is located at a position (home position) h indicated by a broken line in FIG. 12 when the printing apparatus is not performing printing, or when a recovery operation is being performed for the printing heads 201.

Before printing is started, the carriage 106 is located at the home position h. Then, upon receiving a printing start instruction, the carriage 106 is moved in the main scanning direction indicated by the arrow A, and the printing devices provided for the printing heads 201 are driven and eject ink to perform printing in the area on the printing sheet 107 that corresponds to the printing width of the printing heads 201. When the printing has been performed by moving the carriage 106 in the main scanning direction to the end of the printing area for the printing sheet 107, the carriage 106 is returned to the home position h, after which it is moved again in the main scanning direction to perform printing. During the period extending from the end of the previous scanning to the start of the next scanning, the feed roller 103 is rotated in the direction indicated by the arrow, and feeds the printing sheet 107 a required distance in the sub-scanning direction. Through the repetitive performance, in the described manner, of the scanning and the paper feeding procedures, the printing of the printing sheet 107 is completed. The printing operation for ejecting ink from the printing heads 201 is performed by a printing control unit (not shown).

Further, not only when the carriage 106 is moved in the forward direction, but also when the carriage 106 is moved in the reverse direction for returning to the home position h, printing may be performed, i.e., bi-directional printing may be performed, so that the printing speed can be increased.

The ink cartridge 202 may be constituted by integrally forming an ink tank in which printing ink is retained and the printing head 201 that ejects ink onto the printing sheet 107. Or, the ink tank and the printing head 201 may be held in the carriage 106 so that they can be separated. Further, a single printing head 201 that can eject inks having a plurality of colors may be employed.

Capping means (not shown), which closes the front faces (ink orifice formation faces) of the printing heads 201, and a recovery unit (not shown) are located at a position whereat the head recovery operation is performed. The recovery unit removes viscous ink and bubbles in the printing head 201 while the capping means closes the printing heads 201. Further, on the side of the capping means, a cleaning blade (not shown) is projected toward the printing heads 201 and can slide across their front faces. After the head recovery operation has been completed, the cleaning blade is projected so it intersects the route traveled by the printing head 201, and when the printing head 201 is moved, the cleaning blade removes unnecessary ink droplets and dust that are attached to the front face of the printing head 201.

(Configuration Example for a Printing Head)

FIG. 13 is a perspective view of the essential portion for explaining an example structure for the printing head 201.

In the printing head 201 of this embodiment, a plurality of orifices 300, formed at predetermined pitches, communicate with a common liquid chamber 301 through liquid paths 302, while printing devices 303 are provided along the walls of the liquid paths 302 to generate ink ejection energy. The printing devices 303 in this embodiment are heaters (electrothermal converters) that produce thermal energy. The printing devices 303 and their drive circuits are formed on a silicon plate 308 using a semiconductor manufacturing technique. A temperature sensor (not shown) and a sub-heater (not shown) are also formed on the same silicon plate 308 using the same semiconductor manufacturing process. The silicon plate 308, on which this electric wiring is provided, is adhered to an aluminum base plate 307 for the discharge of heat. A circuit connection portion 311 on the silicon plate 308 and a print board 309 are connected by micro wire 310, and a signal from the main body of the printing apparatus is received via a signal circuit 312.

The liquid paths 302 and the common liquid chamber 301 are formed by using a plastic cover 306 fabricated using injection molding. The common liquid chamber 301 is connected to the corresponding ink tank (see FIG. 12) via a joint pipe 304 and an ink filter 305, and ink is supplied from the ink tank to the common liquid chamber 301. Ink that is supplied from the ink tank to the common liquid chamber 301, wherein it is temporarily stored, is transferred to and fills the liquid paths 302 by capillarity, and forms menisci at the orifices 300. Then, the printing devices 303, i.e., heaters, are electrified by an electrode (not shown) and generate heat. Thus, inks on the printing devices 303 are rapidly heated and bubbles are generated in the liquid paths 302. As the bubbles are expanded, ink droplets 313 are ejected from the orifices 300.

(Configuration Example for the Control System of the Printing Apparatus)

FIG. 14 is a block diagram for explaining a configuration example for the control system of the printing apparatus.

An interface 400 is used to receive a printing signal, and a program ROM 402 is used to store a control program to be executed by an MPU 401 that performs data processing that will be described later. A dynamic RAM (DRAM) 403 is used to store various data, such as printing signals and data supplied to the printing heads 201, and also to store the number of printing dots and the number of times the ink tanks and the printing heads 201 are exchanged. A gate array 404 supplies printing data to the printing heads 201, and also transfers data between the interface 400, the MPU 401 and the DRAM 403.

The interface 400 is connected to a host computer (a host apparatus) (not shown), and receives from the host computer image data to be printed by the printing apparatus. A carrier motor (CR motor) 405 is used to move the printing heads 201, and a convey motor (LF motor) 406 is used as a drive source for conveying the printing sheet 107. Motor drivers 407 and 408 are used to drive the carrier motor 405 and the convey motor 406, and a head driver 409 is used to drive the printing heads 201.

(Overall Data Processing)

Figure 1:
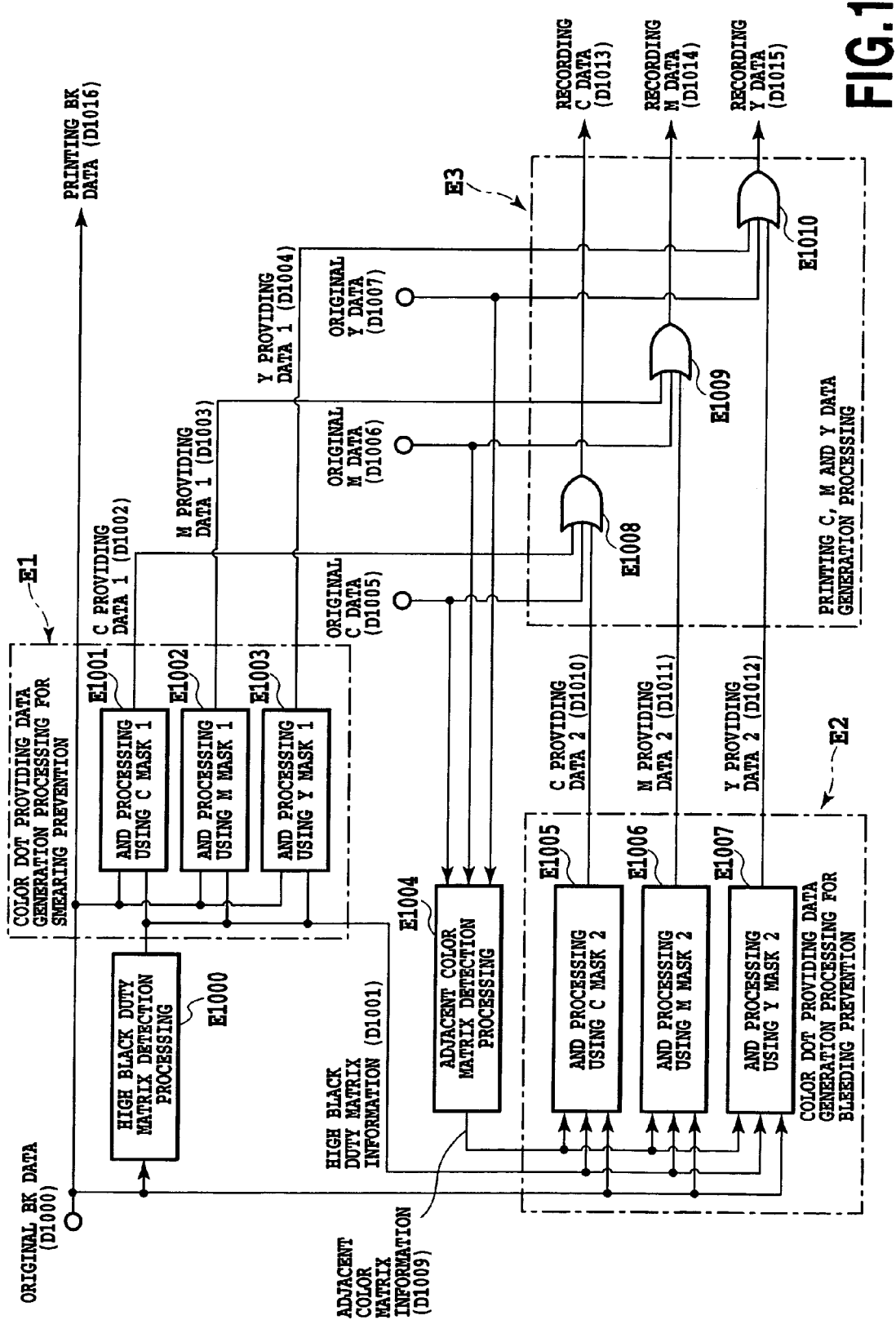
FIG. 1 is a block diagram for explaining the flow of data processing according to a first embodiment of the present invention.

FIG. 1 is a block diagram for explaining a relationship for high black duty matrix detection processing E1000, adjacent color matrix detection processing E1004, color dot provision data generation processing E1 and E2 and printing data generation processing E3, all of which will be described later.

In FIG. 1, original Bk, C, M and Y data D1000, D1005, D1006 and D1007 are binary data obtained by processing color image data transmitted by the host computer. That is, these binary data are data, either "1" or "0", that indicate whether black (Bk), cyan (C), magenta (M) and yellow (Y) inks are to be ejected from the corresponding printing heads 201, i.e., that indicate whether ink dots are to be formed. In this embodiment, the original Bk data D1000 are directly employed as Bk data D1016, which is used for the actual printing. In the following explanation, the Bk data D1000 and D1016 are also called black dot data. The original C, M and Y data D1005, D1006 and D1007 are changed, through the processes that will be described later, and C, M and Y data D1013, D1014 and D1015 are obtained to be used for the actual printing. In the following explanation, the C, M and Y data D1005 to D1007 and D1013 to D1015 are also called color dot data.

The process relationship in FIG. 1, together with explanations for the individual processing, will be described later.

(A) Processing for Detecting a Target Matrix for which Color Dots are to be Provided.

This detection processing is performed to detect a target area in which color dots (dots of color ink), which will be described later, are to be provided. This detection processing includes the high black duty matrix detection processing E1000 (see FIG. 1), for detecting a color dot provision area in order to prevent smearing, and the adjacent color matrix detection processing E1004 (see FIG. 1), for detecting a color dot provision area in order to prevent boundary bleeding.

(A-1) High Black Duty Matrix Detection Processing E1000

Figure 2:
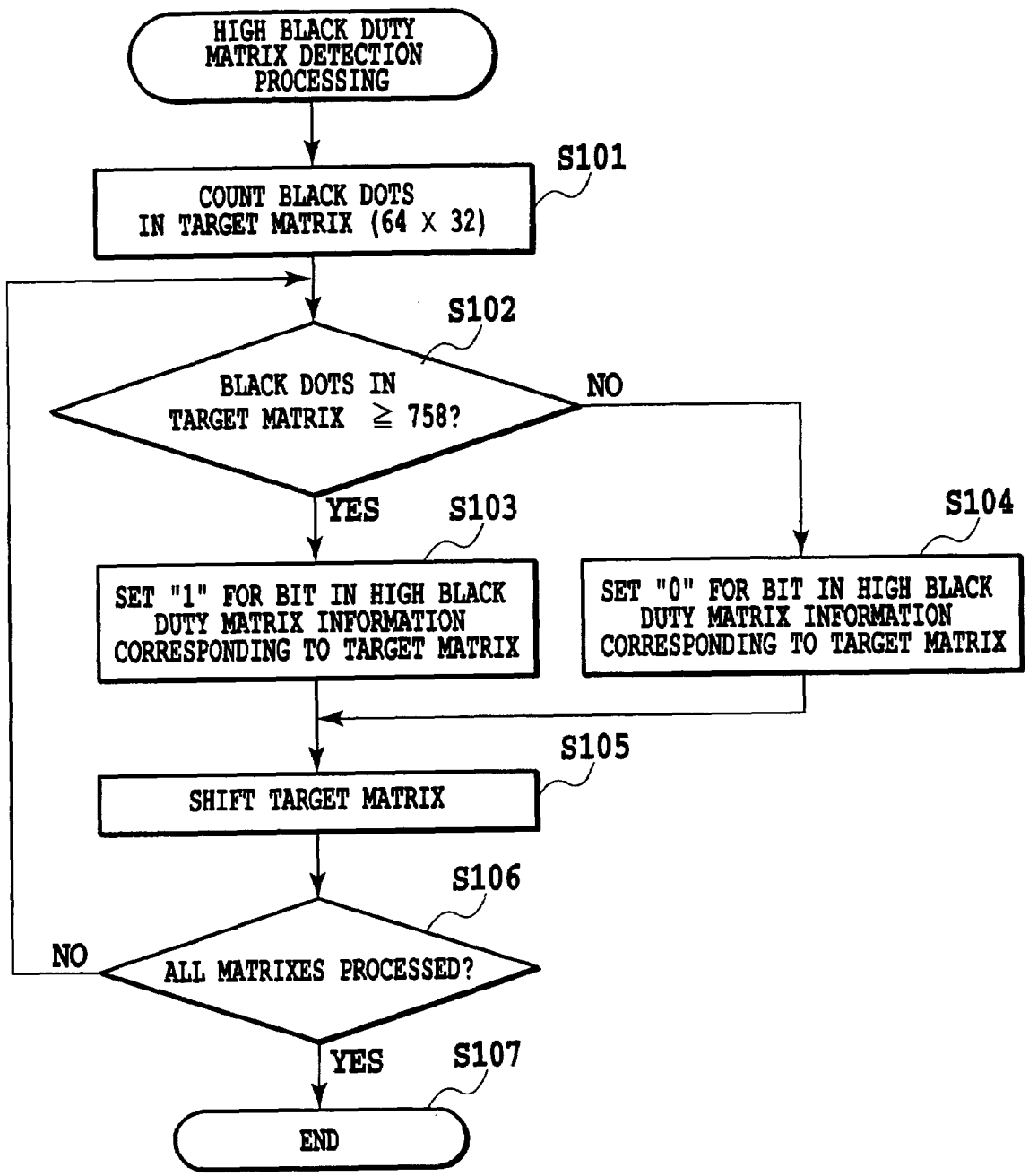
FIG. 2 is a flowchart for explaining a high black duty matrix detection processing in FIG. 1.

FIG. 2 is a flowchart for explaining the high black duty matrix detection processing E1000 for detecting a high black duty matrix as a color dot provision area in order to prevent smearing.

First, a target matrix of 64 (pixels)×32 (pixels) is employed, and dots (hereinafter also referred to as "black dots") of black ink to be formed in the target matrix are counted (step S101). That is, based on the original Bk data D1000 (see FIG. 1), black dots to be formed in the target matrix are counted.

Following this, a check is performed to determine whether the count value for the black dots is equal to 758 or greater, i.e., whether the printing duty is about 37% (=758/(64×32)) or higher (step S102). When the number of black dots is 758 or greater, "1" is set for high black duty matrix information (bit information) D1001 (see FIG. 1) that corresponds to the target matrix (step S103). When the count value for black dots is smaller than 758, "0" is set for the high black duty matrix information that corresponds to the target matrix (step S104). Then, the position of the target matrix in the original Bk data D1000 (see FIG. 1) is shifted (step S105), and a check is performed to determine whether the processing has been completed for all the target matrixes (step S106). When the detection processing E1000 has not been completed for all the target matrixes in the original Bk data D1000, program control returns to step S102. When all the target matrixes have been processed, the detection processing E1000 is terminated (step S107).

As for a matrix for which "1" is set for the high black duty matrix information D1001, dots (color dots) of color ink (C, M and Y ink) are to be provided as will be described later. The threshold value for the number of black dots is not limited to 758, and an optimal value can be set in accordance with the characteristics of the ink and the printing apparatus.

Figures 3A, 3B, 3C:
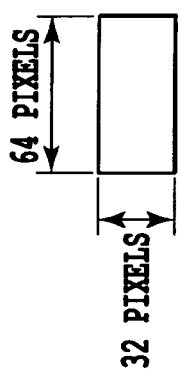
FIG. 3A is a diagram for explaining a target matrix in the high black duty matrix detection processing in FIG. 2.
FIG. 3B is a diagram for explaining the count value for black dots in a matrix.
FIG. 3C is a diagram for explaining high black duty matrix detection information.

FIGS. 3A, 3B and 3C are specific diagrams for explaining the high black duty matrix detection processing E1000.

A target 64×32 matrix is shown in FIG. 3A. For an image, such as a black character, wherein a solid portion in which ink is provided is clearly distinguished from a blank portion in which no ink is provided, when the matrix is too small, a too high response is obtained in accordance with the high black duty matrix information D1001 of "1" and "0" as to whether color dots should be provided.

Therefore, color dots are provided for a small character, and the sharpness of the character will not be maintained. When the matrix is too large, the response as to whether color dots should be provided is deteriorated, so that predetermined color dots will not be provided, and smearing will occur. Therefore, the target matrix should be set to an appropriate size in accordance with the characteristics of the ink and the printing apparatus.

FIG. 3B is a diagram for explaining the count values for black dots in the individual target matrixes of the Bk data D1000 (see FIG. 1). The matrixes for which the count values are 758 or greater are shown as shaded portions. FIG. 3C is a diagram for explaining the high black duty matrix information D1000 obtained as a result of the high black duty matrix detection processing E1000. As previously described, while the position of the target matrix is shifted horizontally or vertically, "1" is set for a bit that corresponds to a matrix for which the count value for black dots is 758 or greater, and "0" is set for a bit that corresponds to a matrix for which the count value for black dots is smaller than 758. Therefore, bitmap information shown in FIG. 3C is obtained as the high black duty matrix information D1001.

(A-2) Adjacent Color Matrix Detection Processing E1004

Figure 4:
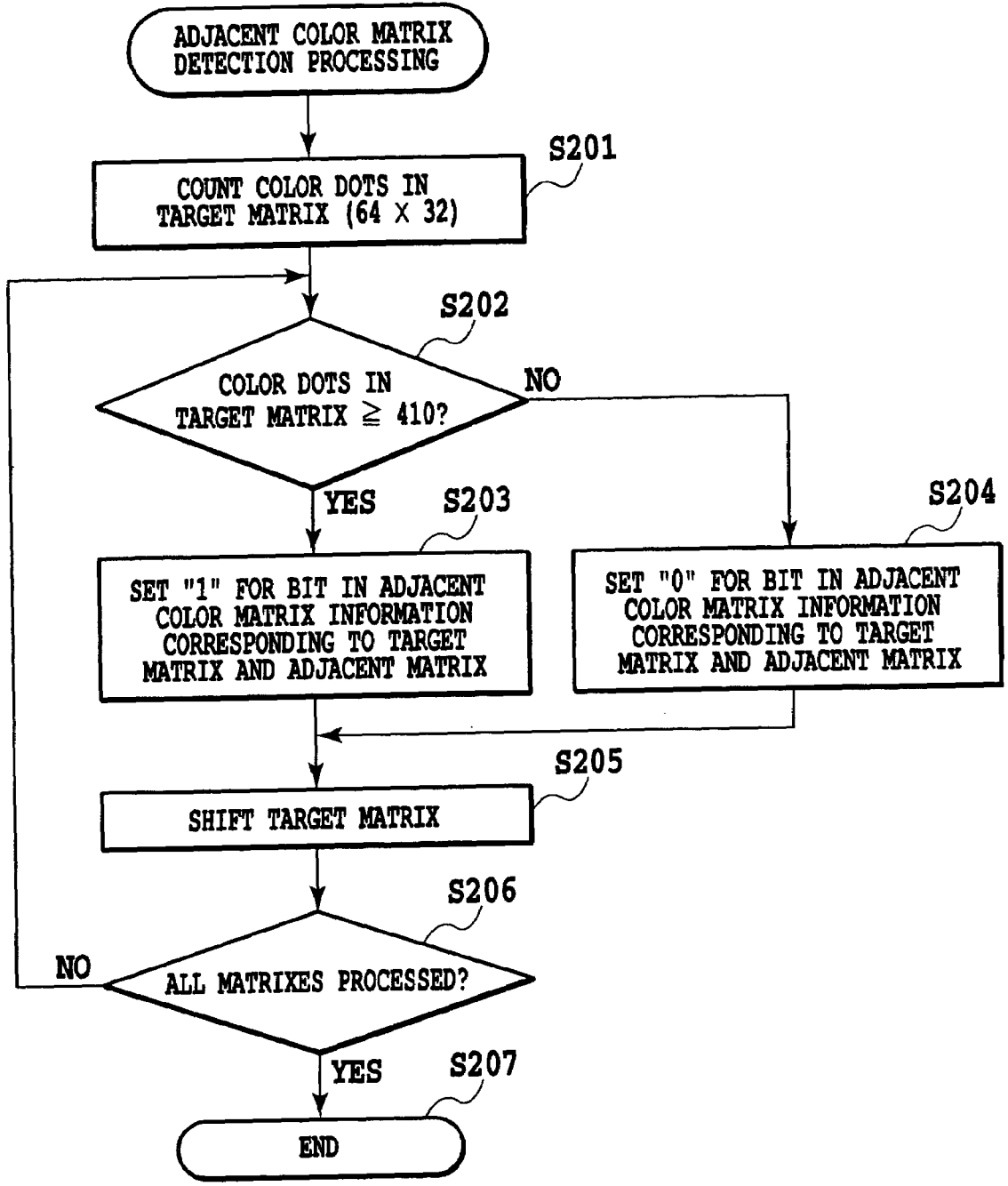
FIG. 4 is a flowchart for explaining an adjacent color matrix detection processing in FIG. 1.

FIG. 4 is a flowchart for explaining the adjacent color matrix detection processing E1004 (see FIG. 1) for boundary bleeding prevention.

First, color dots to be formed in a target 64×32 matrix are counted (step S201). That is, as is shown in FIG. 1, based on the original C data D1005, the original M data D1006 and the original Y data D1007, the total number of C, M and Y ink dots to be formed in the target matrix is counted. Then, a check is performed to determine whether the total number of color dots in the target matrix is 410 or greater (step S202). When the total number of color dots in the target matrix is 410 or greater, "1" is set for the bits that correspond to adjacent color matrix information D1009 (see FIG. 1) for the target matrix and the adjacent 64×32 color matrixes (adjacent matrixes 1, 2, 3 and 4 in FIG. 5A) (step S203). When the number of color dots in the target matrix is smaller than 410, "0" is set for the bit for the adjacent color matrix information D1009 that corresponds to the target matrix (step S204). Sequentially, the position of the target matrix is shifted (step S205). A check is performed to determine whether the adjacent color matrix detection processing E1004 has been completed for all the matrixes (step S207). When all the matrixes have been processed, the adjacent color matrix detection processing E1004 is terminated. When all the matrixes have not been processed, program control returns to step S202, and the above processing is repeated.

The threshold value of color dots is not limited to 410, and an optimal value can be set in accordance with the characteristics of the ink and the printing apparatus. Further, the original C data D1005, the M data D1006 and the Y data D1007 need not always be binary data, and can be any data that are correlated to determine whether ink dots should be provided. Furthermore, for calculating the total of the dots for C, M and Y ink formed in the target matrix, weighting may be performed for each ink type in consonance with the characteristic of the ink.

Figures 5A, 5B, 5C:
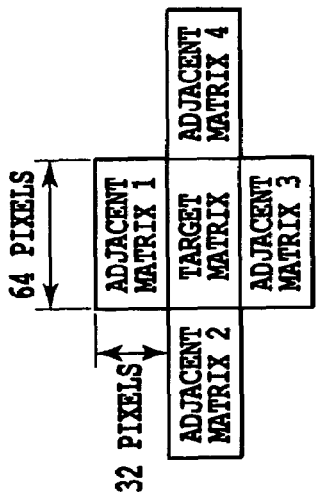
FIG. 5A is a diagram for explaining a target matrix and adjacent matrixes in the adjacent color matrix detection processing in FIG. 4.
FIG. 5B is a diagram for explaining the count value for color dots in a matrix.
FIG. 5C is a diagram for explaining adjacent color matrix information.

FIGS. 5A, 5B and 5C are specific diagrams for explaining the adjacent color matrix detection processing E1004.

A target 64×32 matrix and four adjacent matrixes are shown in FIG. 5A. In this embodiment, matrixes vertically and horizontally adjacent to the target matrix are defined as adjacent matrixes because the occurrence of boundary bleeding can be prevented when a black dot and color dots are adjacent to each other in the boundaries of the target matrix and the adjacent matrixes. Four matrixes positioned diagonally from the target matrix, i.e., matrixes to the upper right, lower right, upper left and lower left of the target matrix, are not regarded as adjacent matrixes because the boundaries of the target matrix are merely points. The size of the matrix and the selection of the adjacent matrix among the total eight matrixes adjacent to the target matrix are appropriately determined in accordance with the characteristics of the ink and the printing apparatus.

FIG. 5B is a diagram for explaining the total number of dots of color inks (cyan, magenta and yellow inks) in the individual matrixes. The matrixes for which the total number of color dots is 410 or greater are shown as shaded portions. FIG. 5C is a diagram for explaining the adjacent color matrix information D1009 obtained as a result of the adjacent color matrix detection processing E1004. As previously described, while the position of the target matrix is shifted horizontally or vertically, "1" is set for bits that correspond to the target matrix for which the count value of color dots is 410 or greater and to the adjacent matrixes, and "0" is set for bits that correspond to the target matrix for which the count value of color dots is smaller than 410. Therefore, bitmap information shown in FIG. 5C is obtained as the adjacent color matrix information D1009.

(B) Color Dot Provision Data Generation Processing

In this processing, data for providing color dots are generated in order to provide color dots in an area detected through the color dot provision target matrix detection processing (E1000 and E1004). This generation processing includes: color dot provision data generation processing E1 (see FIG. 1) for prevention of smearing, i.e., for generating data for providing color dots in order to prevent smearing; and color dot provision data generation processing E2 (see FIG. 1) for prevention of bleeding, i.e., for generating data for providing color dots in order to prevent boundary bleeding.

(B-1) Color Dot Provision Data Generation Processing E1 for Prevention of Smearing FIGS. 6A to 6D are diagrams for explaining the color dot provision data generation processing E1 for prevention of smearing.

In this generation processing, as is shown in FIG. 6A, cyan ink dot providing data (C providing data 1) D1002, magenta ink dot providing data (M providing data 1) D1003 and yellow ink dot providing data (Y providing data 1) D1004 are generated based on the Bk data D1000 in the 64×32 matrix for which "1" is set for the high black duty matrix information D1001 (see FIG. 3C). The C providing data 1 (D1002), the M providing data 1 (D1003) and the Y providing data 1 (D1004) are collectively called color dot provision data 1.

The C providing data 1 (D1002) is generated by calculating a logical product for the Bk data D1000 in the 64×32 matrix, for which "1" is set for the high black duty matrix information D1001, and a cyan mask (C mask 1) of 10 (pixels)×10 (pixels) as is shown in FIG. 6B (AND processing E1001 using the C mask 1 in FIG. 6A). Similarly, the M providing data 1 (D1003) is generated by calculating a logical product for the Bk data D1000 in the 64×32 matrix, for which "1" is set for the high black duty matrix information D1001, and a magenta mask (M mask 1) of 10 (pixels)×10 (pixels) as is shown in FIG. 6C (AND processing E1002 using the M mask 1 in FIG. 6A). Also, the Y providing data 1 (D1004) is generated by calculating a logical product for the Bk data D1000 in the 64×32 matrix, for which "1" is set for the high black duty matrix information D1001, and a yellow mask (Y mask 1) of 10 (pixels)×10 (pixels) as is shown in FIG. 6D (AND processing E1003 using the Y mask 1 in FIG. 6A).

Since the C, M and Y masks 1 are 10×10, these masks are repetitively employed vertically and horizontally in the matrix of 64×32 pixels, and the logical products relative to the Bk data D1000 are obtained. In this embodiment, the duties of the C, M and Y masks 1 are 18%, 6% and 5%, as is shown in FIGS. 6B, 6C and 6D. These duties correspond to the amounts of cyan ink dots, magenta ink dots and yellow ink dots that are to be provided, to prevent smearing, in the printing areas of the matrixes for which "1" is set for the high black duty matrix information D1001. The numbers of ink dots to be provided and the sizes of the masks are appropriately set in accordance with the characteristic of the ink and the configuration of the printing apparatus. Furthermore, the dots in the masks may be arranged either regularly, or at random in a pseudo manner.

(B-2) Color Dot Provision Data Generation Processing E2 for the Prevention of Boundary Bleeding FIGS. 7A to 7D are diagrams for explaining the color dot provision data generation processing E2 for the prevention of boundary bleeding.

In this processing, as is shown in FIG. 7A, cyan ink dot providing data (C providing data 2) D1010, magenta ink dot providing data (M providing data 2) D1011 and yellow ink dot providing data (Y providing data 2) D1012 are generated based on the Bk data D1000 in the 64×32 matrix, for which "1" is set for the adjacent color matrix information D 1009 (see FIG. 5C). The C providing data 2 (D1010), the M providing data 2 (D1011) and the Y providing data 2 (D1013) are collectively called color dot provision data 2.

The C providing data 2 (D1010) is generated by calculating a logical product for the Bk data D1000 in the 64×32 matrix, for which "1" is set for the adjacent color matrix information D1009, and a cyan mask (C mask 2) of 10 (pixels)×10 (pixels) as is shown in FIG. 7B (AND processing E1005 using the C mask 2 in FIG. 7A). Similarly, the M providing data 2 (D1011) is generated by calculating a logical product for the Bk data D1000 in the 64×32 matrix, for which "1" is set for the adjacent colormatrix information D1009, and a magenta mask (M mask 2) of 10 (pixels)×10 (pixels) as is shown in FIG. 7C (AND processing E1006 using the M mask 2 in FIG. 7A). Also, the Y providing data 2 (D1012) is generated by calculating a logical product for the Bk data D1000 in the 64×32 matrix, for which "1" is set for the adjacent color matrix information D1009, and a yellow mask (Y mask 2) of 10 (pixels)×10 (pixels) as is shown in FIG. 7D (AND processing E1007 using the Y mask 2 in FIG. 7A).

Since the C, M and Y masks 2 are 10×10, these masks are repetitively employed vertically and horizontally in the matrix of 64×32 pixels, and the logical products relative to the Bk data D1000 are obtained. In this embodiment, the duties of the C, M and Y masks 2 are 30%, 5% and 5%, as is shown in FIGS. 7B, 7C and 7D. These duties correspond to the amounts of cyan ink dots, magenta ink dots and yellow ink dots that are to be provided, to prevent boundary bleeding, in the printing areas of the matrixes for which "1" is set for the adjacent color matrix information D1009. The numbers of ink dots to be provided and the sizes of the masks are appropriately set in accordance with the characteristic of the ink and the configuration of the printing apparatus. Furthermore, the dots in the masks may be arranged either regularly, or at random in a pseudo manner.

(C) Printing C, M and Y Data (Color Data) Generation Processing E3

In this generation processing E3 (see FIG. 1), printing C, M and Y data (D1013 to D1015) are generated by affecting, in the original C, M and Y data (D1005 to D1007), the color dot provision data 1 (D1002 to D1004) for the prevention of smearing and the color dot provision data 2 (D1010 to D1012) for the prevention of boundary bleeding.

Figure 8:
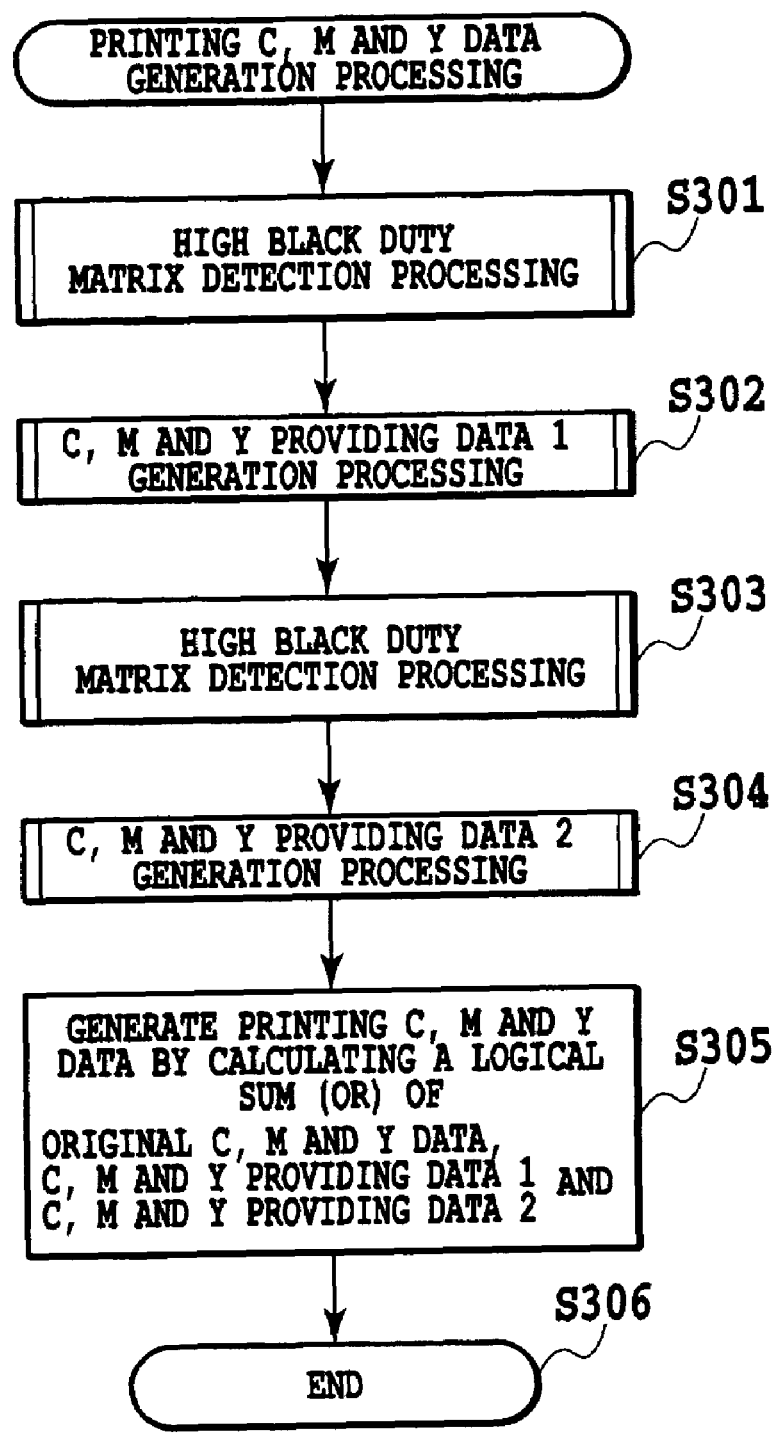
FIG. 8 is a flowchart for explaining printing C, M and Y data generation processing in FIG. 1.

FIG. 8 is a flowchart for explaining the printing C, M and Y data generation processing E3.

In FIG. 8, the process at step S301 corresponds to the high black duty matrix detection processing (E1000) described above, and the process at step S302 corresponds to the color dot provision data generation processing for generating the cyan, magenta and yellow providing data 1 for the prevention of smearing. The process at step S303 corresponds to the adjacent color matrix detection processing (E1004) described above, and the process at step S304 corresponds to the color dot provision data generation processing for generating the cyan, magenta and yellow providing data 2 for the prevention of boundary bleeding. In the printing C, M and Y data generation processing E3, after the processes at steps S301 to S304 have been completed, the OR processing E1008, E1009 and E1010 in FIG. 1 is performed to generate printing C, M and Y data D1013, D1014 and D1015 (step S305).

That is, in the OR processing E1008, the printing C data D1013 is generated by calculating a logical sum for the original C data D1005, the C providing data 1 (D1002) and the C providing data 2 (D1010). In the OR processing E1009, the printing M data D1014 is generated by calculating a logical sum for the original M data D1006, the M providing data 1 (D1003) and the M providing data 2 (D1011). In the OR processing E1010, the printing Y data D1015 is generated by calculating a logical sum for the original Y data D1007, the Y providing data 1 (D1004) and the Y providing data 2 (D1012).

(Printing Operation Based on Printing C, M, Y and Bk Data)

C, M, Y and Bk inks are ejected from the corresponding printing heads 201 based on the printing C, M, Y and Bk data D1013 to D1016, and a color image is formed on the printing sheet 107.

When the black data, such as a data for a solid image, has a comparatively high duty, i.e., has a high count value of black dots in a unit printing area (target matrix), color dots are provided in the unit printing area based on the providing data 1 (D1002 to D1004). As a result, the occurrence of smearing can be prevented. On the other hand, when the black data, such as a data for a character, has a comparatively low duty, color dots are not provided for the printing area. As a result, a high quality black character having sharp edges can be printed. Further, when the black data is present in a color data printing area, for which the count value for color dots for a unit printing area is high, and in an adjacent printing area (adjacent matrix), color dots are provided for the printing areas based on the providing data 2 (D1010 to D1012). As a result, boundary bleeding at the black dot provision area and the color dot provision area can be prevented, and a high quality color image can be obtained.

Second Embodiment

When a black image for which color dots are provided is compared with an image consisting only of black dots, a reduction in the density is comparatively small, even when the black dots are thinned out. On the other hand, smearing or boundary bleeding is sometimes considerably reduced by removing black dots having low permeability.

In this embodiment, in order to even more reduce the occurrence of smearing and boundary bleeding, a predetermined amount of original Bk data is thinned out for a high black duty matrix (matrix for which "1" is set for the high black duty matrix information) detected in the first embodiment, and for an adjacent color matrix (matrix for which "1" is set for adjacent color matrix information) detected in the first embodiment.

Figure 9A:
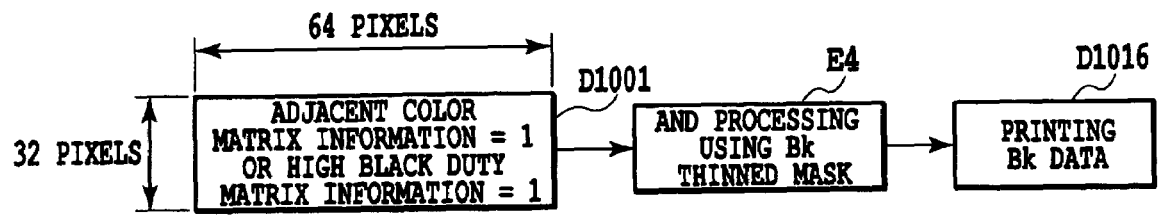
FIG. 9A is a diagram for explaining a black data thinning-out processing according to a second embodiment of the present invention.
Figure 9B:
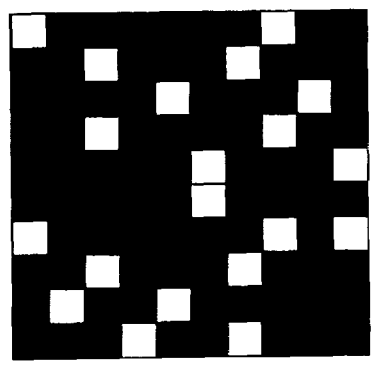
FIG. 9B is a diagram for explaining a Bk thinned mask in FIG. 9A.

FIGS. 9A and 9B are diagrams for explaining the thinning-out process for the original Bk data D1000.

In this embodiment, through the AND processing E4 in FIG. 9A, the printing Bk data D1016 is generated by calculating a logical product for a thinned mask shown in FIG. 9B (black thinned mask) and the Bk data D1001 in a matrix for which "1" is set for the adjacent color matrix information D1009 or the high black duty matrix information D1001. The Bk thinned mask in this embodiment is 10 (pixels)×10 (pixels), and is repetitively employed horizontally and vertically relative to the Bk data D1001 of 64×32 pixels. In this embodiment, the Bk thinned mask is a pattern for the 10×10 size having an 80% duty. However, the size and the duty can be optimized in accordance with the characteristic of the ink and the configuration of the printing apparatus. The thinning-out process is performed when "1" is set for one or both of the high black duty matrix information D1001 and the adjacent color matrix information D1009.

According to this embodiment, since black dots are thinned out in the black data area having a comparatively high duty and the black data area adjacent to color dots, the suppression of smearing and boundary bleeding can be improved.

Third Embodiment

In a third embodiment, when a printing head is employed wherein head chips that can eject different ink are arranged in the main scanning direction, the printing direction is controlled based on the high black duty matrix information D1001, so that the prevention of smearing can be improved.

Figure 10A:
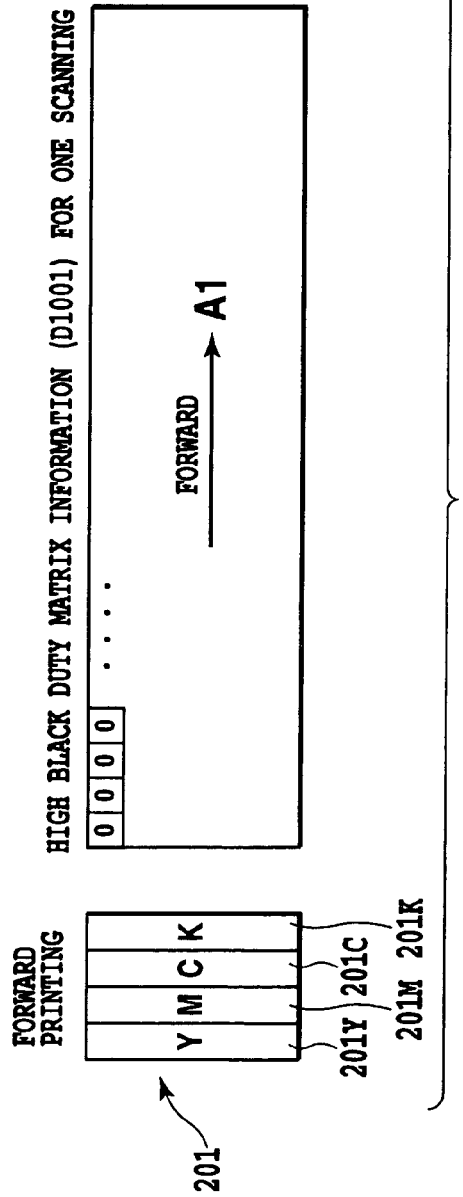
FIG. 10A is a diagram for explaining a forward printing operation according to a third embodiment of the present invention.
Figure 10B:
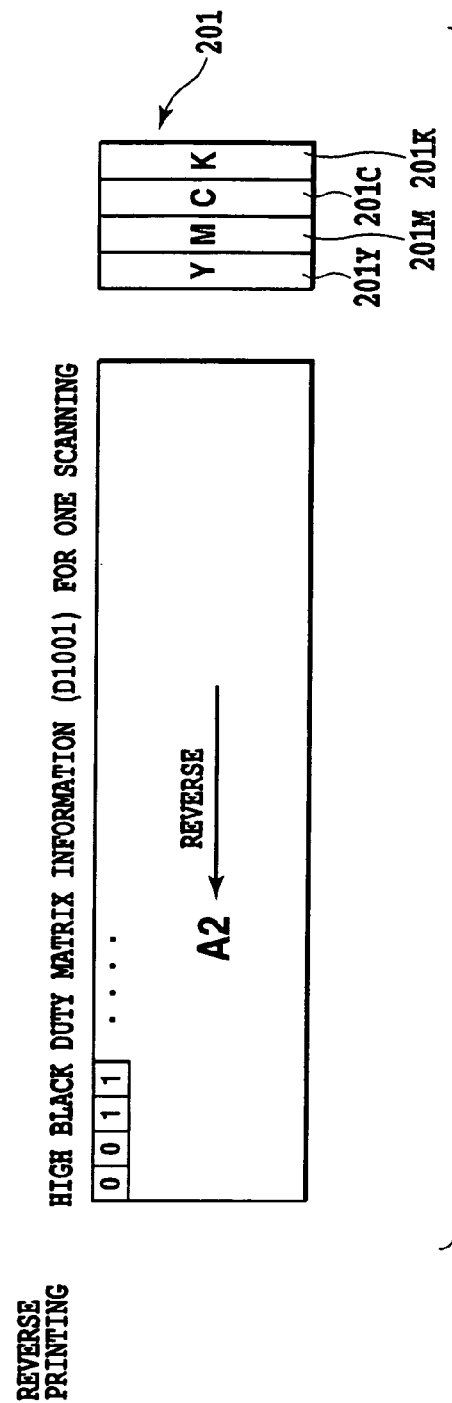
FIG. 10B is a diagram for explaining a reverse printing operation according to the third embodiment of the present invention.

FIG. 10A is a diagram for explaining the forward (left-to-right) printing operation for performing printing while moving the printing head 201 in the direction indicated by an arrow A1. FIG. 10B is a diagram for explaining the reverse (right-to-left) printing operation for performing printing while moving the printing head 201 in the direction indicated by an arrow A2. The printing head 201 is so constituted that head chips 201Y, 201M, 201C and 201K, which can eject yellow (Y), magenta (M), cyan (C) and black (K) inks, are arranged in the main scanning direction. The head chips 201Y, 201M, 201C and 201K may serve as individual printing heads, and in this case, these printing heads are arranged in the main scanning direction.

During the forward printing in FIG. 10A, ink is provided to the same printing area of the printing sheet 107 in the order black, cyan, magenta and yellow. During the reverse printing in FIG. 10B, ink is provided to the printing area of the printing sheet 107 in the order yellow, magenta, cyan and black.

Generally, in a printing apparatus that employs a set of color inks, such as yellow, magenta and cyan inks, having a comparatively high permeability and black ink having a comparatively low permeability, color ink is provided first and black ink is then overlaid, because the prevention of smearing effect is increased. In this embodiment, therefore, to form and overlay black dots and color dots, the reverse printing direction shown in FIG. 10B is set to provide color ink before black ink.

Figure 11:
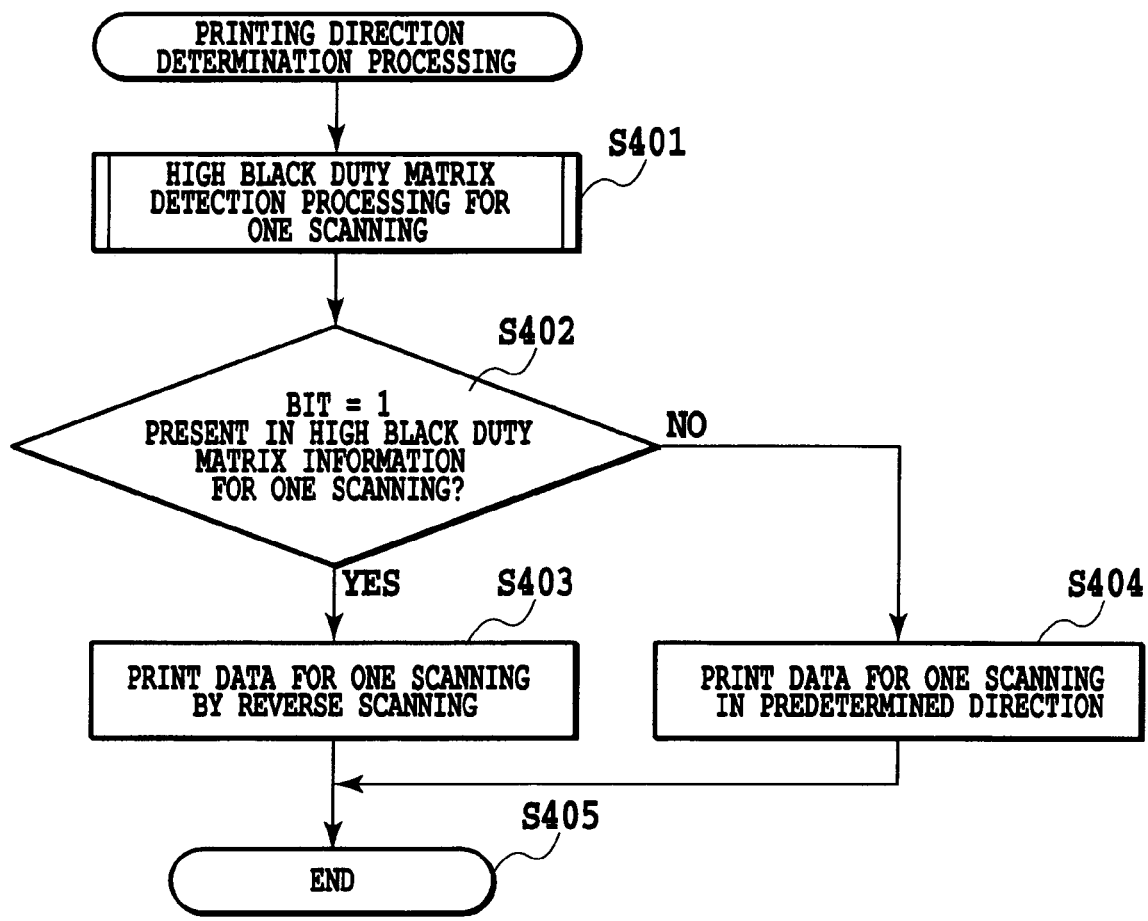
FIG. 11 is a flowchart for explaining a printing direction determination processing according to the third embodiment of the present invention.

FIG. 11 is a flowchart for explaining the processing for determining the printing direction.

First, the high black duty matrix detection processing E1000 described above is performed for the Bk data D1000 for one scanning (printing) (step S401). Then, a check is performed to determine whether bit=1 is present in the high black duty matrix information D1001 for one scanning (step S402). When the information bit=1 is present as is shown in FIG. 10B, the reverse printing direction is designated, and data for one scanning is printed using reverse scanning, as is shown in FIG. 10B (step S403). Whereas, when the information bit=1 is not present, as is shown in FIG. 10A, printing is performed in a predetermined printing direction (step S404). In this case, printing in the predetermined printing direction is either the forward printing or the reverse printing using the bidirectional printing system whereby forward printing and reverse printing are alternately repeated, or using a unidirectional printing system whereby only the forward printing is repeated.

In this embodiment, the printing direction is designated in accordance with the presence/absence of the information bit=1 in the high black duty matrix information D1001 for one scanning. However, when there are a predetermined number of sets or more of information bit=1, the printing direction may be designated. A condition for designating the printing direction can be optimized in accordance with the characteristics of the ink and the printing apparatus.

According to this embodiment, when black data having a comparatively high duty is included in the printing data for one scanning, the printing direction is determined so that color ink is provided first and then black ink is provided in the same printing area. As a result, the prevention of smearing effect can be improved.

Another Embodiment

In the third embodiment, the printing direction has been designated based on the high black duty matrix information D1001 for the prevention of smearing. However, the printing direction may be designated based on the color dot adjacent matrix information D1009, so that the prevention of boundary bleeding effect can also be improved.

Furthermore, the present invention is applied not only for a printing apparatus of a serial scan type, but also for a full line printing apparatus that employs a printing head that is arranged across the overall widthwise area of the printing area of a printing medium.

Further, the color ink type is not limited to yellow, magenta, cyan inks, and various other inks can be included. In addition, as described above, black ink having a comparatively low permeability and color ink having a comparatively high permeability can be employed. At least one color ink may be a reactive ink that reacts to black ink to be coagulated. In this case, the reactive ink may be cyan ink.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

This application claims priority from Japanese Patent Application No. 2003-411061 filed Dec. 9, 2003, which is hereby incorporated by reference herein.

What is claimed is:

1. An ink jet printing apparatus using a printing head capable of ejecting black ink and at least one color ink for printing an image on a printing medium by forming black dots of the black ink and color dots of the color ink based on black data for ejecting the black ink and color data for ejecting the color ink, comprising:
   first detecting means for detecting a first printing area in which the number of the black dots to be formed is a predetermined value or greater, based on the black data;
   second detecting means for detecting, as a second printing area, a printing area in which the color dots are to be formed and an adjacent printing area adjacent to the printing area, based on the color data;
   first providing data generating means for generating first providing data for providing the color dots in the first printing area, based on the black data corresponding to the first printing area;
   second providing data generating means for generating second providing data for providing the color dots in the second printing area, based on the black data corresponding to the second printing area;
   printing color data generating means for generating printing color data based on the first providing data, the second providing data and the color data; and
   control means for controlling the printing head based on the black data and the printing color data for printing the image.

2. An ink jet printing apparatus according to claim 1, wherein said first detecting means counts, based on the black data, the number of the black dots to be formed in a unit printing area of L pixels×M pixels (L and M are natural numbers of 1 or greater), and defines, as the first printing area, the unit printing area for which the count value is the predetermined value or greater.

3. An ink jet printing apparatus according to claim 1, wherein said second detecting means counts, based on the color data, the number of the color dots to be formed in a unit printing area of L pixels×M pixels (L and M are natural numbers of 1 or greater), and defines, as the second printing area, the unit printing area for which the count value is a predetermined value or greater.

4. An ink jet printing apparatus according to claim 1, wherein
   said first providing data generating means generates the first providing data by calculating a logical product for the black data corresponding to the first printing area and a first mask used for the provision of color dots; and
   said second providing data generating means generates the second providing data by calculating a logical product for the black data corresponding to the second printing area and a second mask used for the provision of color dots.

5. An ink jet printing apparatus according to claim 4, wherein the color ink is ink of a plurality of different colors, and
   the first mask and the second mask are individually prepared for the inks of different colors.

6. An ink jet printing apparatus according to claim 1, wherein said printing color data generating means generates the printing color data by calculating a logical product for the first providing data and the second providing data.

7. An ink jet printing apparatus according to claim 1, wherein the color ink includes yellow, magenta and cyan ink.

8. An ink jet printing apparatus according to claim 7, wherein said second detecting means detects, as the second printing area, a printing area wherein dots of the yellow ink, the magenta ink and the cyan ink are to be formed, and an adjacent printing area adjacent to the printing area, based on yellow data for ejecting the yellow ink, magenta data for ejecting the magenta ink and cyan data for ejecting the cyan ink.

9. An ink jet printing apparatus according to claim 1, wherein a permeability of the black ink is lower than a permeability of the color ink.

10. An ink jet printing apparatus according to claim 1, wherein the at least one color ink is a reactive ink that reacts with the black ink.

11. An ink jet printing apparatus according to claim 10, wherein the reactive ink is cyan ink.

12. An ink jet printing apparatus according to claim 1, wherein said control means forms the black dots in the first printing area based on data obtained by thinning out the black data corresponding to the first printing area.

13. An ink jet printing apparatus according to claim 1, wherein said control means forms the black dots in the second printing area based on data obtained by thinning out the black data corresponding to the second printing area.

14. An ink jet printing apparatus according to claim 12, wherein said control means thins out the black data by calculating a logical product for the black data and a black data thinning mask.

15. An ink jet printing apparatus according to claim 1, further comprising:

moving means for moving the printing head in a main scanning direction; and conveying means for conveying the printing medium in a sub-scanning direction perpendicular to the main scanning direction, wherein a portion of the printing head for ejecting the black ink and a portion of the printing head for ejecting the color ink are positioned so as to be shifted away from each other in the main scanning direction, and said control means permits the printing head to eject the black ink and the color ink, while the printing head is being moved in the main scanning direction.

16. An ink jet printing apparatus according to claim 15, wherein said control means determines a direction in which the printing head is moved to eject the black ink and the color ink, based on detection information obtained by said first detecting means.

17. An ink jet printing apparatus according to claim 15, wherein said control means determines a direction in which the printing head is moved to eject the black ink and the color ink, based on detection information obtained by said second detecting means.

18. An ink jet printing apparatus according to claim 16, wherein said control means determines the direction in which the printing head is moved to eject the black ink and the color ink, so that a first color dot is formed and then a black dot is formed in the same printing area.

19. An ink jet printing method using a printing head capable of ejecting black ink and at least one color ink for printing an image on a printing medium by forming black dots of the black ink and color dots of the color ink based on black data for ejecting the black ink and color data for ejecting the color ink, comprising the steps of:

detecting a first printing area in which the number of the black dots to be formed is a predetermined value or greater, based on the black data;

detecting, as a second printing area, a printing area in which the color dots are to be formed and an adjacent printing area adjacent to the printing area, based on the color data;

generating first providing data for providing the color dots in the first printing area, based on the black data corresponding to the first printing area;

generating second providing data for providing the color dots in the second printing area, based on the black data corresponding to the second printing area;

generating printing color data based on the first providing data, the second providing data and the color data; and controlling the printing head based on the black data and the printing color data for printing the image.

\* \* \* \* \*